(12) United States Patent
Billings et al.

(10) Patent No.: US 10,570,755 B2
(45) Date of Patent: Feb. 25, 2020

(54) FAN BLADE ROOT

(71) Applicant: UNITED TECHNOLOGIES CORPORATION, Farmington, CT (US)

(72) Inventors: Scott C. Billings, Marlborough, CT (US); William R. Graves, Amston, CT (US); Jason Elliott, Huntington, IN (US); David P. Houston, Glastonbury, CT (US); Ethan C. Drew, Mansfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 637 days.

(21) Appl. No.: 14/617,614

(22) Filed: Feb. 9, 2015

(65) Prior Publication Data

US 2016/0230572 A1 Aug. 11, 2016

(51) Int. Cl.
*F01D 5/30* (2006.01)
*F02C 3/04* (2006.01)

(52) U.S. Cl.
CPC ......... *F01D 5/3092* (2013.01); *F01D 5/3007* (2013.01); *F02C 3/04* (2013.01); *F05D 2220/32* (2013.01); *F05D 2220/36* (2013.01); *F05D 2230/10* (2013.01); *F05D 2230/23* (2013.01); *F05D 2240/30* (2013.01); *F05D 2300/432* (2013.01); *F05D 2300/433* (2013.01); *F05D 2300/603* (2013.01); *F05D 2300/6034* (2013.01); *Y02T 50/672* (2013.01)

(58) Field of Classification Search
CPC ..... F01D 5/3092; F01D 5/3007; F01D 5/3015
See application file for complete search history.

(56) References Cited

U.S. PATENT DOCUMENTS

| | | | |
|---|---|---|---|
| 5,522,706 | A | 6/1996 | Mannava et al. |
| 2008/0223099 | A1 | 9/2008 | David |

(Continued)

FOREIGN PATENT DOCUMENTS

| | | | |
|---|---|---|---|
| DE | 102014206758 A1 | 10/2015 | |
| EP | 1555329 A1 | 7/2005 | |

(Continued)

OTHER PUBLICATIONS

European Office Action for Application No. 16 154 415.0; dated Jun. 27, 2017.

(Continued)

*Primary Examiner* — David E Sosnowski
*Assistant Examiner* — Sabbir Hasan
(74) *Attorney, Agent, or Firm* — Cantor Colburn LLP (57) ABSTRACT

A dovetail root of a fan blade configured for operation within the fan assembly of a gas turbine engine. The dovetail root is imparted with a compressive residual stress layer along the outer faces of the dovetail root preventing crack formation within the dovetail root when the gas turbine engine is in operation. To further protect and structurally enhance the dovetail root, a wear covering is disposed on the dovetail root. The wear covering may consist of a composite laminate layer that is bonded to the metallic core of the dovetail root providing additional cracking protection of the dovetail root when the gas turbine engine is in operation.

8 Claims, 6 Drawing Sheets

(56) References Cited

U.S. PATENT DOCUMENTS

| | | | | |
|---|---|---|---|---|
| 2011/0286854 A1* | 11/2011 | Watson | ............... | F01D 5/288 |
| | | | | 416/241 R |
| 2013/0055882 A1* | 3/2013 | Egres, Jr. | ............ | D04C 1/02 |
| | | | | 89/36.02 |
| 2013/0302173 A1* | 11/2013 | Booze | ................. | F01D 5/282 |
| | | | | 416/230 |

FOREIGN PATENT DOCUMENTS

| | | |
|---|---|---|
| EP | 2388439 A2 | 11/2011 |
| EP | 2540977 A2 | 1/2013 |
| EP | 2955326 A1 | 12/2015 |
| WO | 2014137438 A1 | 9/2014 |
| WO | 2014143318 A1 | 9/2014 |
| WO | 2014164859 A2 | 10/2014 |

OTHER PUBLICATIONS

English Translation to DE102014206758 Abstract.
European Search Report for EP Application No. 16154415.
European Office Action for Application No. 16 154 415.0; dated Jun. 4, 2018.

\* cited by examiner

FAN BLADE ROOT

FIELD OF DISCLOSURE

The present disclosure generally relates to gas turbine engines, and more particularly to a fan blade root.

BACKGROUND OF THE DISCLOSURE

Gas turbine engines are commonly used to generate energy and propulsion in many modern aircraft as well as other vehicles and industrial processes. Many such engines include a fan, compressor, combustor and turbine provided in serial fashion, forming an engine core and arranged along a central longitudinal axis. Air enters the gas turbine engine through the fan and is pressurized in the compressor. This pressurized air is mixed with fuel in the combustor. The fuel-air mixture is then ignited, generating hot combustion gases that flow downstream to the turbine. The turbine is driven by the exhaust gases and mechanically powers the compressor and fan via a central rotating shaft. Energy from the combustion gases not used by the turbine is discharged through an exhaust nozzle, producing thrust to power the aircraft.

In light of this it can be seen that the airfoils of a gas turbine engine, including the fan, compressor, and turbine blades and vanes, are subjected to extreme internal temperatures and weather conditions when the gas turbine engine is in operation. Accordingly, such airfoils need to be manufactured well. This is important not only for efficient, proper operation, but for safe operation as well. For example, given the proximity of such engines to the fuselage of the aircraft, it is important that such blades remain connected to their respective rotor hubs, and in the rare event of dislodgement, that the blades be contained within the engine. In fact, the Federal Aviation Administration requires that gas turbine engines meet certain requirements in this regard and thus sets forth regulations, such as 14 C.F.R. § 33.94, pertaining to blade containment.

One situation, which may be particularly challenging for gas turbine engines in this regard, arises when the engine ingests foreign objects, such as birds or ice. The blades, in such a situation, must be manufactured sufficiently to withstand such impact, and absent that, the engine as a whole must be sufficiently designed to contain such blades if they should become dislodged.

Therefore, it would be advantageous to produce a fan blade of sufficient strength and design to avoid dislodgement, even in the event of foreign object ingestion. Ideally, the fan blade would be designed and built strong enough to not only meet FAA requirements, but to far exceed them as well.

SUMMARY OF THE DISCLOSURE

In accordance with one aspect of the disclosure, an airfoil root is formed having a core. A wear covering is disposed onto the core of the airfoil root.

In an additional and/or alternative embodiment of any of the foregoing embodiments, the wear covering is a composite laminate layer.

In an additional and/or alternative embodiment of any of the foregoing embodiments, the composite laminate layer is an integrally bonded woven laminate containing a mixture of polytetratittoroethylene and poly-meta-phenylene isophthalamide fibers arranged in an inverse fashion to produce a right angle grid.

In an additional and/or alternative embodiment of the foregoing embodiment, a compressive residual stress layer is treated into the core of the airfoil root. The compressive residual stress layer is produced by burnishing the core of the airfoil root.

In an additional and/or alternative embodiment, the wear covering is adhered to the compressive residual stress layer by an epoxy bond.

In an additional and/or alternative embodiment of any of the foregoing embodiment, the core of the airfoil root has a first pressure face and a second pressure face angled outward from a vertical axis of the core, a first runout fillet disposed into and traveling the length of the first pressure face and a second runout fillet disposed into and traveling the length of the second pressure face, a horizontal face connecting the first pressure face to the second pressure face located at a bottom of the core, and a neck portion extending above the first pressure face and the second pressure face.

In an additional and/or alternative embodiment of any of the foregoing embodiments, the wear covering is adhered to the first runout fillet and the second runout fillet of the core.

In an additional and/or alternative embodiment of any of the foregoing embodiments, the wear covering is adhered to the neck portion of the core.

In an additional and/or alternative embodiment of any of the foregoing embodiments, a compressive residual stress layer is treated into the first runout fillet and the second runout fillet of the core.

In accordance with another aspect of the disclosure, a gas turbine engine is formed having a fan, a compressor downstream of the fan, a combustor downstream of the compressor, and a turbine downstream of the combustor. The fan has a plurality of fan blades connected to a rotor. The plurality of fan blades each have an airfoil component and an airfoil root. The airfoil root has a core and a wear covering adhered to the core of the airfoil root.

In an additional and/or alternative embodiment of any of the foregoing embodiments, the wear covering disposed onto to the core of the airfoil root is a composite laminate layer.

In an additional and/or alternative embodiment of any of the foregoing embodiments, the composite laminate layer is an integrally bonded woven laminate containing a mixture of polytetrafluoroethylene and poly-meta-phenylene isophthalamide fibers arranged in an inverse fashion to produce a right angle grid.

In an additional and/or alternative embodiment of any of the foregoing embodiments, a compressive residual stress layer is treated into the core of the airfoil root. The compressive residual stress layer is produced by burnishing the core of the airfoil root.

In an additional and/or alternative embodiment of any of the foregoing embodiments, the wear covering disposed onto the core of the airfoil root is adhered to the compressive residual stress layer by an epoxy bond.

In an additional and/or alternative embodiment of any of the foregoing embodiments, the core of the airfoil root has a first pressure face and a second pressure face angled outward from a vertical axis of the core, a first runout fillet disposed into and traveling the length of the first pressure face and a second runout fillet disposed into and traveling the length of the second pressure face, a horizontal face connecting the first pressure face to the second pressure face located at a bottom of the core, and a neck portion extending above the first pressure face and the second pressure face.

In an additional and/or alternative embodiment of any of the foregoing embodiments, the wear covering is adhered to the first runout fillet and the second runout fillet of the core of the airfoil root.

In an additional and/or alternative embodiment of any of the foregoing embodiments, the wear covering is adhered to the neck portion of the core of the airfoil root.

In an additional and/or alternative embodiment of any of the foregoing embodiments, the compressive residual stress layer provided in the core of the airfoil root is treated into the first runout fillet and the second runout fillet of the core.

In accordance with another aspect of the disclosure, a method of making an airfoil for a gas turbine engine is depicted. An airfoil is machined to have an airfoil root. Then, a wear covering is disposed onto the airfoil root.

In accordance with a further aspect of the disclosure, the method of making an airfoil root includes treating the airfoil root to produce a compressive residual stress layer. The compressive residual stress layer is achieved by burnishing the airfoil root.

These and other aspects and features will be better understood when taken in conjunction with the following drawings.

It should be understood that the drawings are not necessarily to scale and that the disclosed embodiments are illustrated diagrammatically and in partial views. It should be further understood that this disclosure is not to be limited to the particular embodiments illustrated herein.

Definitions

To facilitate a better understanding of the invention, terms and phrases are defined below:

As used herein, the term "compressive residual stress layer" refers to a stress layer imparted into an airfoil root by a process modifying the mechanical properties of the airfoil root. The compressive residual stress layer is not a layer of stress inherent in the airfoil root, but is added to the airfoil root by an additional process applied to the material of the airfoil root.

DETAILED DESCRIPTION OF THE DISCLOSURE

Figure 1:
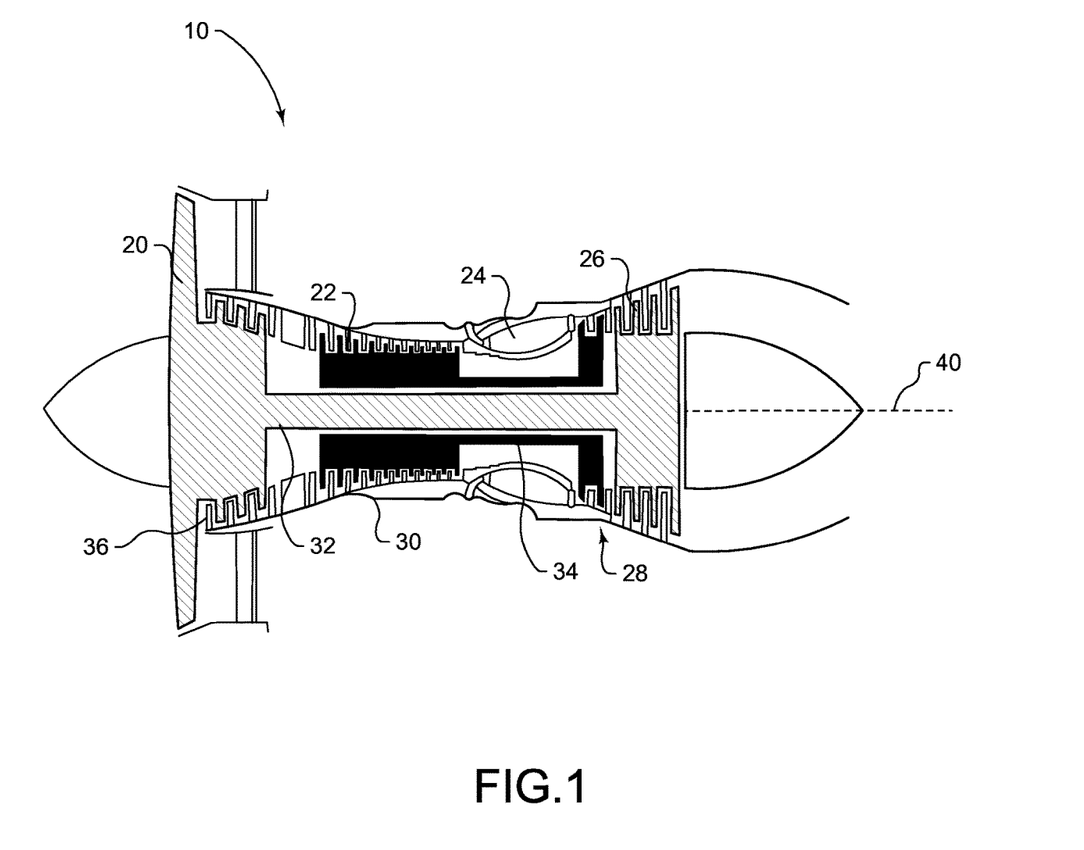
FIG. 1 is a cross-sectional view of a gas turbine engine constructed in accordance with the teachings of the present disclosure.

Referring now to the drawings and with specific reference to FIG. 1, a gas turbine engine constructed in accordance with the present disclosure is generally referred to by reference numeral 10. As illustrated, the engine 10, includes from fore-to-aft, a fan 20, a compressor 22, a combustor 24, a turbine 26, known as the engine core 28, lying along a central longitudinal axis 40, and surrounded by an engine core cowl 30. The compressor 22 is connected to the turbine 26 via a central rotating shaft 32. More specifically, the engine 10, is depicted as a multi-spool engine design. Plural turbines sections 26 are connected to, and drive, corresponding plural sections of the compressor 22 and a fan 20 via the central rotating shaft 32 and a concentric rotating shaft 34, enabling increased compression efficiency.

Ambient air enters the compressor 22 at an inlet 36, is pressurized, and is then directed to the combustor 24, mixed with fuel and combusted. This generates combustion gases that flow downstream to the turbine 26, which extracts kinetic energy from the exhausted combustion gases. The turbine 26, via the central rotating shaft 32 and concentric rotation shaft 34, drives the compressor 22 and the fan 20, which draws in ambient air. Thrust is produced both by ambient air accelerated aft by the fan 20 and by exhaust gasses exiting from the engine core 28. While the depicted embodiment is described as a multi-spool type of gas turbine engine, it is to be understood that the teachings of the present disclosure are not limited in application to the depicted embodiment of a gas turbine engine, but rather should be employed with equal efficacy.

Figure 2:
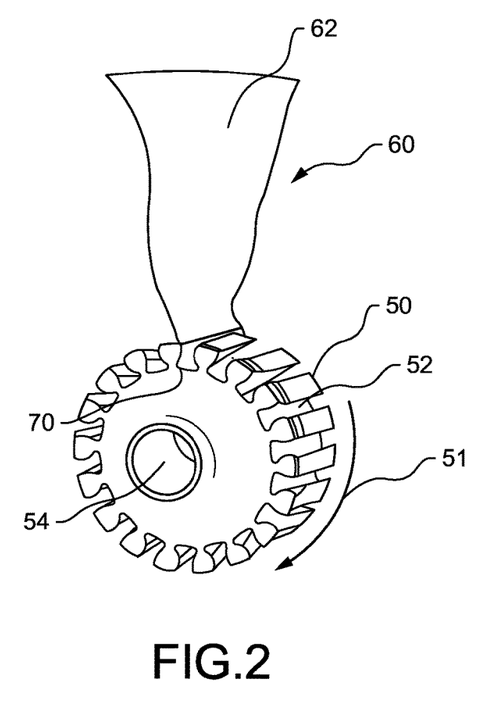
FIG. 2 is a perspective view of a fan blade inserted into a disc rotor of a gas turbine engine in accordance with the present disclosure.

Referring now to FIG. 2, the fan 20 is shown in greater detail. More specifically, the fan 20 includes a disc rotor 50 having multiple slots 52 disposed around the circumference 51 of the disc rotor 50. The slots 52 are equally spaced around the circumference 51 of the disc rotor 50. In the center of the disc rotor 50, a bearing aperture 54, running along the central longitudinal axis 40, is present where a central rotating shaft 32 or another connection can fit the fan 20 to the power generation unit of the gas turbine engine 10.

Radially extending from the rotor 50, a plurality of fan blades 60 are provided. As will be noted, each fan blade includes a blade section 62 and a root 70. The root 70 may be dovetail in shape, with the slots 52 being complementarily formed to receive the dovetail root 70 in a secure fashion. Given this size and shape, the dovetail root 70 presses against the sides of the slots 52 due to centrifugal force when the disc rotor 50 spins around the central longitudinal axis 40. The slots 52 pressing against the dovetail root 70 therefore prevent the fan blade 60 from dislodging from the disc rotor 50 when the gas turbine engine 10 is in operation.

Figure 3:
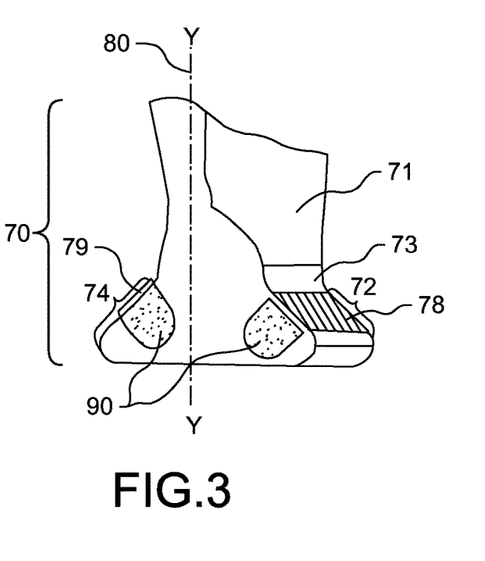
FIG. 3 is an enlarged view of a dovetail root section of a fan blade constructed in accordance with the present disclosure and shown angled to the right.
Figure 4:
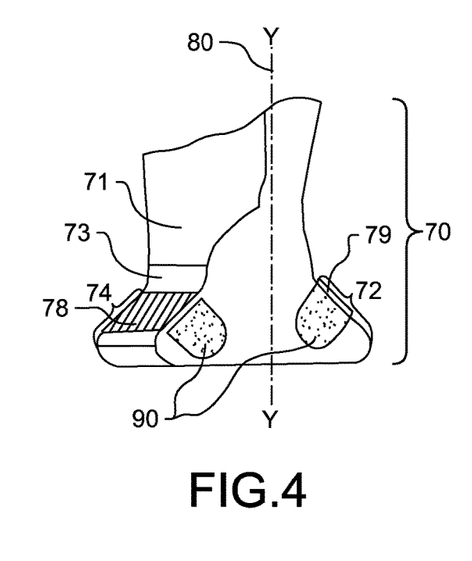
FIG. 4 is an enlarged view of a dovetail root section of a fan blade constructed in accordance with the present disclosure and shown angled to the left.

Viewing FIGS. 3 and 4, the dovetail root 70 can be seen in more detail. The dovetail root 70 is formed from a metallic core 71, which may be an aluminum alloy. The dovetail root 70 has a first pressure face 72 and a second pressure face 74 angling outward from the vertical axis 80 of the dovetail root 70. At the bottom of the dovetail root 70, a horizontal face 76 connects the first pressure face 72 to the second pressure face 74. A neck portion 73 extends upward from both the first pressure face 72 and the second pressure face 74 of the dovetail root 70, and attaches to the blade component 62 of the fan blade 60.

A first runout fillet 78 is machined onto the first pressure face 72 of the dovetail root 70 so that it may fit into a slot 52 of the disc rotor 50. Likewise, a second runout fillet 79 is machined onto the second pressure face 74 of the dovetail root 70 so that it may fit the same. The first runout fillet 78 and the second runout fillet 79 each travel the length of their respective pressure faces, and may be equal to each other in their size, shape and formation on the dovetail root 70.

In order to achieve the desired dovetail root 70, a compressive residual stress layer 90 is treated into the first runout fillet 78 and the second runout fillet 79 of the dovetail root 70. Treating the fillets 78 and 79 of the dovetail root 70 in such a way imparts the compressive residual stress layer 90 into the dovetail root 70. One treatment for doing so is burnishment. Other methods for imparting a compressive residual stress layer 90, such as but not limited to shot peening, can be also used. To burnish the fillets 78 and 79 of the dovetail root 70, a heavy pressure is applied to the fillets 78 and 79 in a controlled manner such as using a roller(s) or the like.

Figure 5:
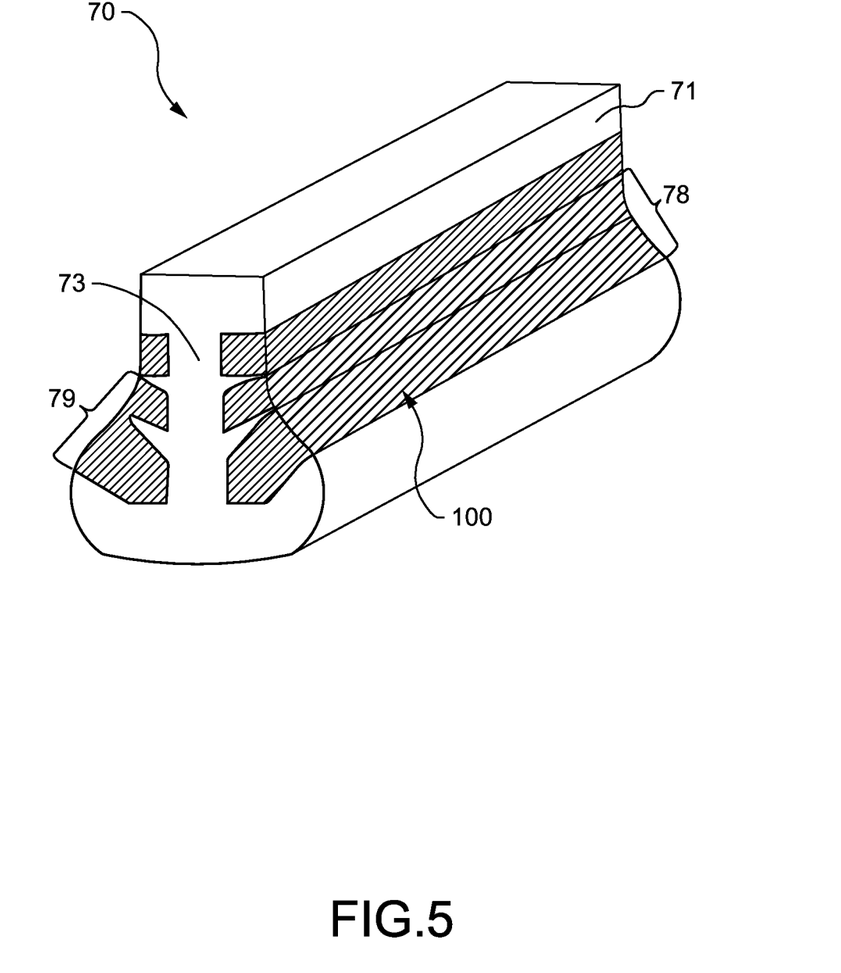
FIG. 5 is an elongated cross-sectional view of a dovetail root of a fan blade in accordance with the present disclosure showing placement of a wear covering on the dovetail root.

Referring now to FIG. 5, another way the desired dovetail root 70 is achieved is by disposing a wear covering 100 on the dovetail root 70. The wear covering 100 may envelop the length of the first runout fillet 78 of the first pressure face 72 as well as the second runout fillet 79 of the second pressure face 74 of the dovetail root 70. Additionally, the wear covering 100 can extend to envelop the neck portion 73 of the dovetail root 70 above both the first runout fillet 78 and the second runout fillet 79. The wear covering 100 envelops the dovetail root 70 in a precise geometric pattern over the dovetail root 70 so that the areas of the dovetail root 70 which press against the walls of the slot 52 are adequately protected when the disc rotor 50 rotates. Configuring the wear covering 100 in such a way prevents cracking and deformation of the dovetail root 70 when the gas turbine engine 10 is in operation. Additionally, the wear covering 100 protects the dovetail root 70 from handling damage when placing the dovetail root 70 into the slot 52 of the disc rotor 50.

Figure 6:
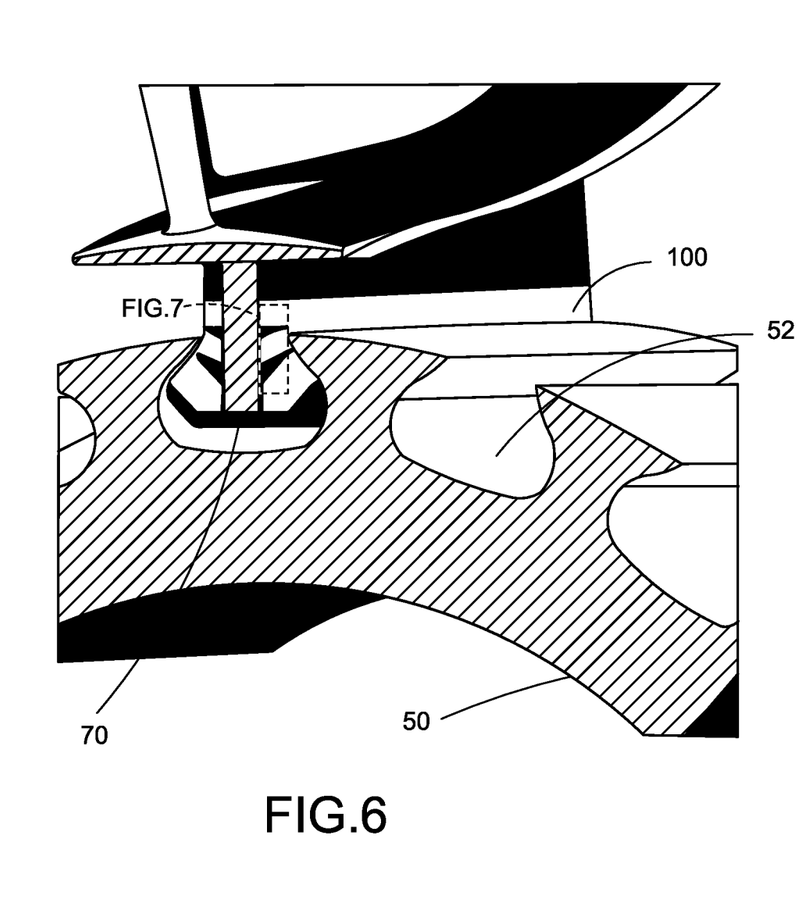
FIG. 6 is a cross-sectional view of a dovetail root of a fan blade in accordance with the present disclosure, showing placement of a wear covering on the dovetail root when the dovetail root is placed in a disc rotor of a gas turbine fan engine.

As illustrated in FIG. 6, the dovetail root 70 is placed within one of the slots 52 of the disc rotor 50. As will be understood, the dovetail root 70 has already been treated and implanted with the compressive residual stress layer 90 described above. A wear covering 100, also as understood and described above, is affixed to the outside of the dovetail root 70 before placing the dovetail root 70 into the slot 52. Placing the dovetail root 70 into the slot 52 in this fashion and with the added protection of the compressive residual stress layer 90 and the wear covering 100 prevents cracking and deformation of the dovetail root 70 when the gas turbine engine 10 is in operation. Furthermore, reducing crack formation and deformation of the dovetail root 70 prevents the likelihood of the dovetail root 70 dislodging from the slot 52 of the disc rotor 50 when the gas turbine engine 10 is in operation.

Figure 7:
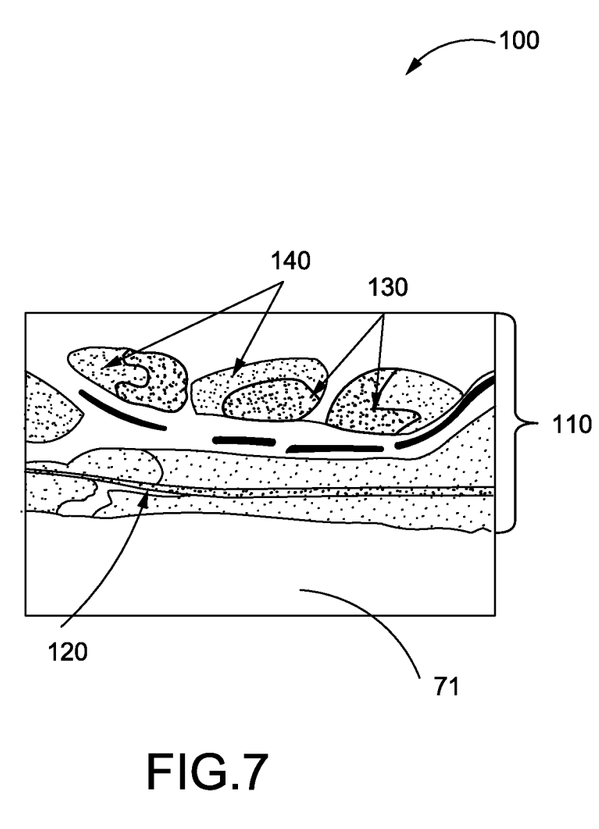
FIG. 7 is an enlarged cross-section of area 7 from FIG. 6 showing a wear covering in accordance with the present disclosure attached to the dovetail root.

The wear covering 100 is depicted in greater detail in FIG. 7. As illustrated, the wear covering 100 is bonded by an epoxy 120, adhesive or the like to the dovetail root 70. The wear covering 100 can be affixed to the metallic core 71 of the dovetail root 70 in other fashions including but not limited to scribing. The wear covering 100 can be a composite laminate layer 110 made from integrally bonded woven laminate. Many materials can be used to form integrally bonded woven laminates including but not limited to Teflon® (polytetrafloroethylene) fibers 130 and Nomex® (poly-meta-phenylene isophthalamide) fibers 140, although other substantially similar materials may be used. Polytetrafluoroethylene fibers 130 have a low coefficient of friction against solid masses. Because of this, polytetrafluoroethylene fibers 130 reduce friction and wear when used on machinery. Poly-meta-phenylene isophthalamide fibers 140 are rigid and very durable. Additionally, poly-meta-phenylene isophthalamide fibers 140 have fire resistant qualities which allow the poly-meta-phenylene isophthalamide fibers 140 to hold up well in the extreme operation temperatures and conditions of a gas turbine engine 10. Furthermore, the polytetrafluoroethylene fibers 130 and the poly-meta-phenylene isophthalamide fibers 140 may be arranged in an inverse fashion so as to produce a right angle grid. The wear covering 100 may then be epoxy bonded 120 onto the dovetail root 70.

Figure 8:
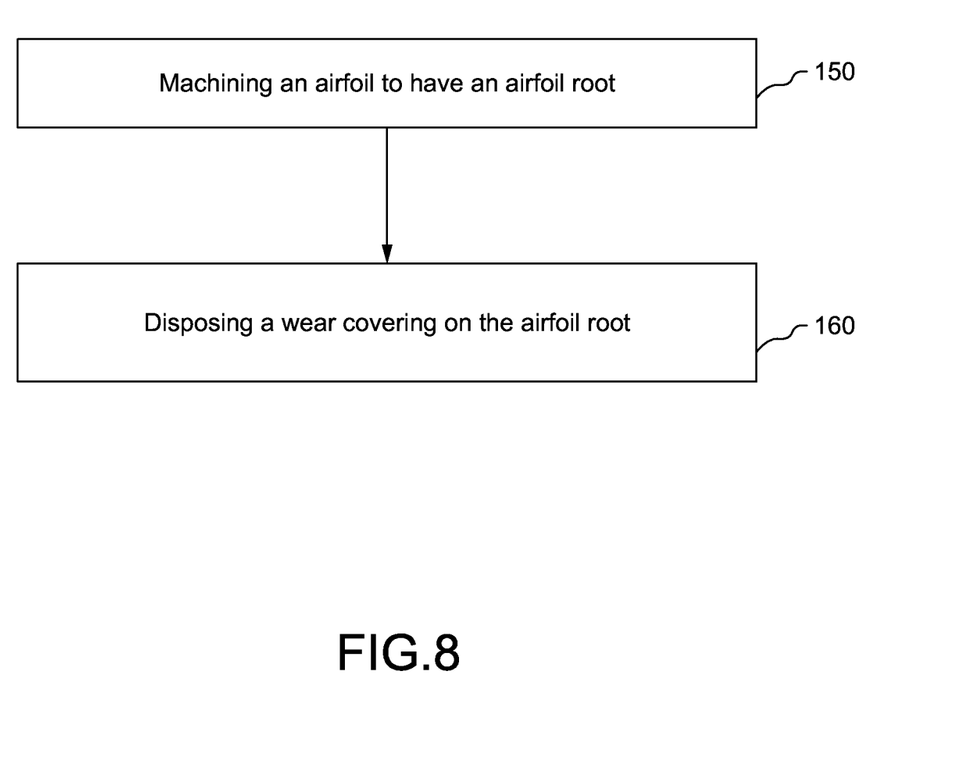
FIG. 8 is a flowchart that exemplifies one method of making the disclosed dovetail root in accordance with the present disclosure.
Figure 9:
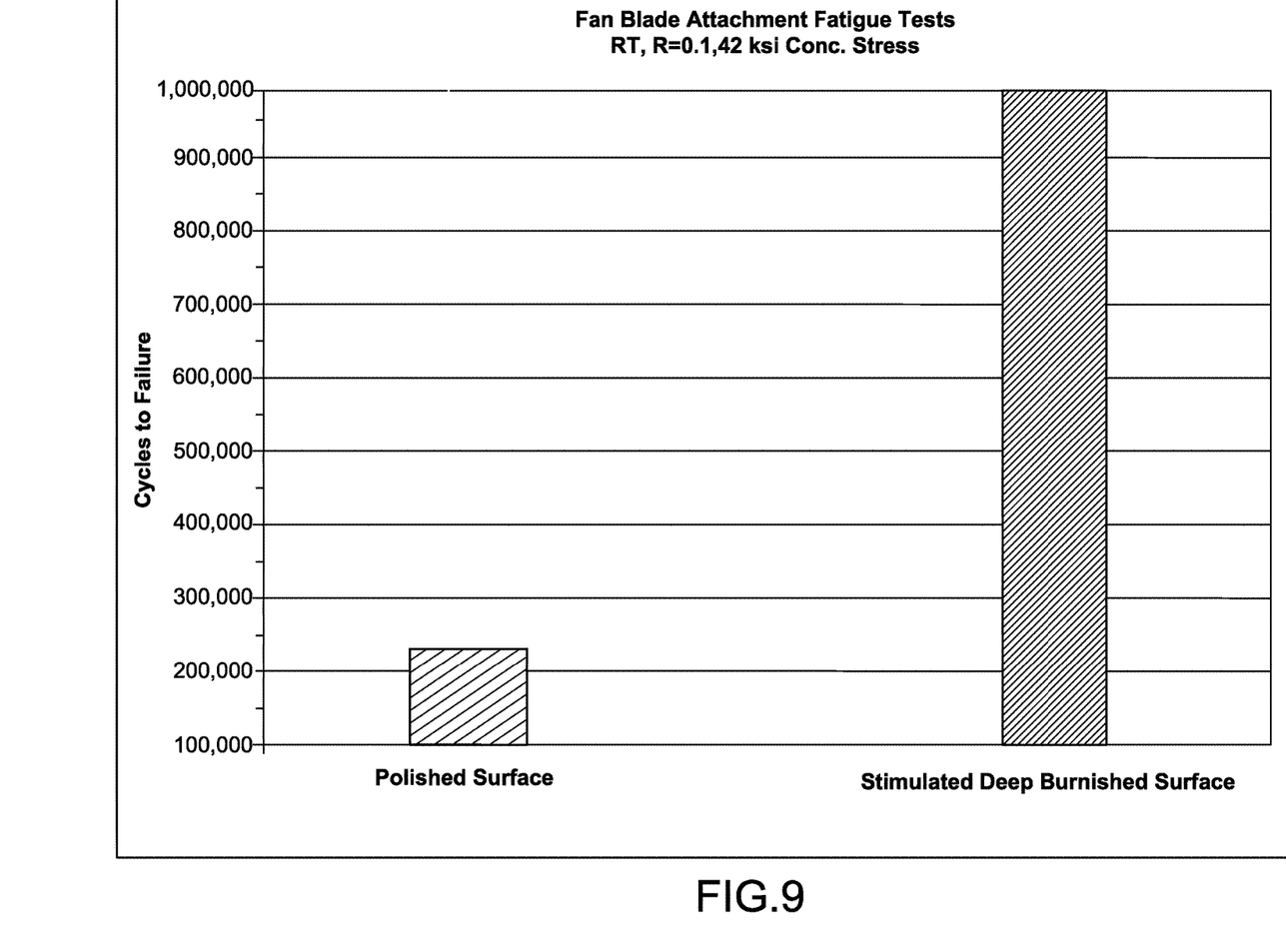
FIG. 9 is a graph that exemplifies the approximate number of cycles to failure of a prior art dovetail root in comparison to a dovetail root in accordance with the present disclosure.

Referring now to FIG. 8, an exemplary succession of steps which may be used to produce an airfoil or fan blade 60 for a gas turbine engine 10 in accordance with the present disclosure are shown. Starting with block 150, an airfoil or fan blade 60, is machined to have an airfoil root 70. Then, as illustrated by block 160, a wear covering 100 is disposed on the of the airfoil root 70. The wear covering 100 can be a composite laminate layer 110 made from integrally bonded woven laminate. Many materials can be used to form integrally bonded woven laminates including, but not limited to, polytetrafluoroethylene fibers 130 and poly-meta-phenylene isophthalamide fibers 140. Additionally the wear covering can be disposed on the airfoil root 70 by adhering it to the airfoil root 70 with an epoxy 120, other adhesive or the like. Disposing the wear covering 100 on the airfoil root 70 provides an addition layer of protection to guard the airfoil root 70 from crack initiation while a gas turbine engine 10 is in operation. Additionally, the airfoil root 70 can be treated to have a compressive residual stress layer 90. Treating the airfoil root or 70 to have a compressive residual stress layer 90 can be done by burnishing the airfoil root 70. The compressive residual stress layer 90 aids in the prevention of crack initiation within the airfoil root 70 when a gas turbine engine 10 is in operation. Furthermore, the wear covering 100 may be disposed on the compressive residual stress layer 90 of the airfoil root 70.

Graphically, FIG. 8 illustrates the significant improvement in strength achieved by the burnished dovetail root 70 of the present disclosure as opposed to a prior art polished dovetail root. If a metallic core is simply polished as with the prior art and placed into testing conditions, the resulting cycles to failure are shown in the bar chart to be roughly 225,000 cycles. If, however, the dovetail root 70 is treated to impart a compressive residual stress layer 90 into the metallic core 71 of the dovetail root 70 as with the prior art, the resulting cycles to failure can be dramatically increased. More specifically, the number of cycles to failure for such a burnished dovetail root 70 can be viewed with the bar representing stimulated deep burnished surface as roughly one million cycles. Comparing the two bars against one another it can be seen that the dovetail root 70 of the present disclosure lasts at least four times longer, if not greater, before failing in respect to a dovetail root having only a polished surface.

INDUSTRIAL APPLICABILITY

From the foregoing, it may be appreciated that the dovetail roots disclosed herein may have industrial applicability in a variety of setting such as, but not limited to, use in a gas turbine engine environment. Such disclosed dovetail roots may also be used, for example, in aerospace or marine machines for generating thrust, or in industrial or mining applications for generating power.

Additionally in the field of gas turbine engines for aviation, such dovetail roots substantially avoid cracking or other fatigue related inconsistencies so as to provide a stronger and longer lasting blade and root. Use of the disclosed dovetail roots also allow for the production of more light weight and thus, more efficient gas turbine engines. Moreover, as such roots are less susceptible to cracking, they are also less susceptible to dislodgement from the engine rotor.

While the foregoing detailed description has addressed only specific embodiments, it is to be understood that the scope of the disclosure is not intended to be limiting. Thus, the breadth and spirit of this disclosure is intended to be broader than any of the embodiments specifically disclosed and/or encompassed within the claims appended hereto.

We claim:

1. An airfoil component, comprising:
   a root comprising a core, the core comprising; a first pressure face and a second pressure face angled outward from a vertical axis of the core, a first runout fillet disposed into and traveling the length of the first pressure face and a second runout fillet disposed into and traveling the length of the second pressure face, a horizontal face connecting the first pressure face to the second pressure face located at a bottom of the core, and a neck portion extending above the first pressure face and the second pressure face, and a compressive residual stress layer treated into the first runout fillet and the second runout fillet; and
   a wear covering disposed onto the core, wherein the wear covering envelopes the first runout fillet and the second runout fillet and wherein the wear covering is a composite laminate layer, wherein the composite laminate layer is an integrally bonded woven laminate containing a mixture of polytetrafluoroethylene and poly-meta-phenylene isophthalamide fibers, wherein the polytetrafluoroethylene and poly-meta-phenylene isophthalamide fibers are arranged in an inverse fashion to produce a right angle grid.

2. The airfoil component according to claim 1, wherein the compressive residual stress layer is produced by a burnishing of the core.

3. The airfoil component according to claim 2, wherein the wear covering is adhered to the compressive residual stress layer by an epoxy bond.

4. The airfoil component according to claim 1, wherein the wear covering is adhered to the neck portion of the core.

5. A gas turbine engine, comprising:
   a fan having a plurality of fan blades connected to a rotor, the plurality of fan blades each having an airfoil component, the airfoil component having a root, the root comprising a core, the core comprising; a first pressure face and a second pressure face angled outward from a vertical axis of the core, a first runout fillet disposed into and traveling the length of the first pressure face and a second runout fillet disposed into and traveling the length of the second pressure face, a horizontal face connecting the first pressure face to the second pressure face located at a bottom of the core, and a neck portion extending above the first pressure face and the second pressure face, and a compressive residual stress layer treated into the first runout fillet and the second runout fillet and a wear covering wherein the wear covering envelopes the first runout fillet and the second runout fillet, and wherein the wear covering is a composite laminate layer, wherein the composite laminate layer is an integrally bonded woven laminate containing a mixture of polytetrafluoroethylene and poly-meta-phenylene isophthalamide fibers, wherein the polytetrafluoroethylene and poly-meta-phenylene isophthalamide fibers are arranged in an inverse fashion to produce a right angle grid;
   a compressor downstream of the fan;
   a combustor downstream of the compressor; and
   a turbine downstream of the combustor.

6. The gas turbine engine according to claim 5, wherein the compressive residual stress layer being produced by a burnishing of the core of the root.

7. The gas turbine engine according to claim 6, wherein the wear covering is adhered to the compressive residual stress layer of the root by an epoxy bond.

8. The gas turbine engine according to claim 5, wherein the wear covering is adhered to the neck portion of the root.

* * * * *